Patented Oct. 28, 1952

2,615,232

UNITED STATES PATENT OFFICE 2,615,232

PRODUCTION OF METALLIC FLUORIDES

John F. Gall, Narberth, and Henry C. Miller, Wyndmoor, Pa., assignors to The Pennsylvania Salt Manufacturing Company, Philadelphia, Pa., a corporation of Pennsylvania No Drawing. Application November 8, 1951, Serial No. 255,527

17 Claims. (Cl. 23—88)

This invention relates to the preparation of high valence metallic fluorides and more particularly to the preparation of cobalt trifluoride.

Cobalt trifluoride has recently been finding increasing use as a fluorinating agent due to the ease with which it can be handled and the amount of available fluorine it contains. In some instances the use of cobalt trifluoride as the fluorinating agent is the only present practical way of fluorinating certain organic compounds.

Elemental fluorine has heretofore been used in the production of cobalt trifluoride. The elemental fluorine was usually reacted with cobalt chloride to produce this compound. The use of elemental fluorine, for the production of cobalt trifluoride, however, is objectionable for numerous reasons. Cobalt trifluoride is extremely reactive when it comes in contact with any moisture. It is, therefore, preferable to prepare the cobalt trifluoride shortly before using the same for fluorinating organic compounds. If the cobalt trifluoride has been prepared and stored for any substantial length of time, it is generally advisable to regenerate the cobalt trifluoride before using the same as a fluorinating agent. Because of the low critical temperature (—129° C.) of fluorine as well as the dangers involved in shipping the gas under pressure, the use of elemental fluorine for preparing or regenerating cobalt trifluoride is impractical where the elemental fluorine is produced at substantial distances from where the cobalt trifluoride is to be prepared or regenerated. This makes it necessary, when elemental fluorine is used either for the purpose of preparing or regenerating cobalt trifluoride, to have near the place of preparation a fluorine generating cell. Since the electrolytic preparation of elemental fluorine is in and of itself a difficult and critical procedure requiring a substantial amount of apparatus as well as considerable know-how in its operation, it immediately becomes apparent why any fluorinating process requiring the maintenance and operation of a fluorine cell would be unsatisfactory.

We have found that cobalt trifluoride can be readily and conveniently prepared by the reaction of either chlorine trifluoride or bromine pentafluoride on cobalt or cobalt-containing compounds under substantially anhydrous conditions. Both chlorine trifluoride and bromine pentafluoride are easily liquefied, and shipped, stored and handled as liquids, their boiling points at one atmosphere pressure being respectively 11.3° and 40.5° C. The use of these compounds in the preparation of cobalt trifluoride enables the production of cobalt trifluoride or its generation near where the organic material is being fluorinated without necessitating such added expense or equipment as would be necessary where elemental fluorine is used.

Although we believe substantially all cobalt-containing materials are suitable for our preparation of cobalt trifluoride, we have found it preferable to react either cobalt oxides or cobalt difluoride with the chlorine trifluoride or the bromine pentafluoride, the cobalt oxide preferred being cobaltosic oxide. Other possible cobalt reactants include cobalt metal, cobalt carbonate, cobalt chloride and cobalt hydroxide. At least some of the fluorine in chlorine trifluoride or bromine pentafluoride is sufficiently reactive, we believe, to combine with cobalt present in any cobalt-containing material.

The reaction between the cobalt-containing material and the chlorine trifluoride or bromine pentafluoride should be carried out under substantially anhydrous conditions since the cobalt trifluoride reacts readily with any moisture, decomposing into cobalt difluoride. Both chlorine trifluoride and bromine pentafluoride react vigorously with water so that any moisture that may be initially present in the reactor with the cobalt-containing material is rapidly removed through its reaction with the fluorinating agent. However, since this unnecessarily wastes part of the fluorinating agent, it is preferred to have the cobalt-containing material substantially dry before adding the chlorine trifluoride or the bromine pentafluoride thereto. If moisture is prevented from entering the reactor, the atmosphere inside the reactor is soon substantially anhydrous even though small amounts of moisture may be present therein at the start of the reaction due to its reaction with the chlorine trifluoride or bromide pentafluoride. This anhydrous condition must be maintained if the final cobalt trifluoride product is to be obtained in any substantial yields.

We have discovered that in order to prepare the cobalt trifluoride rather than the cobalt difluoride, it is necessary to carry out the reaction at a temperature in excess of 240° C. Due to the high reactivity of chlorine trifluoride and bromine pentafluoride, some cobalt trifluoride can be formed by adding liquid chlorine trifluoride or bromine pentafluoride directly to powdered cobalt at room temperature. The violence of the resulting reaction raises the temperature sufficiently high to enable the formation of some cobalt trifluoride. The cobalt trifluoride product formed, however, is unsatisfactory since it is badly sintered and requires grinding before it can satisfactorily be used as a fluorinating material. Since the compound is highly reactive and tends to decompose, any excess handling such as grinding is to be avoided if possible.

Chlorine trifluoride is sufficiently reactive that it will also react with cobaltosic oxide at room temperature with sufficient violence to raise the temperature of the reactants to the point where some cobalt trifluoride is formed. Here again the final product, where formed, is a sintered mass that must be broken up before it can be used. The addition of liquid bromine pentafluoride to powdered cobaltosic oxide failed to give any noticeable cobalt trifluoride, probably due to the fact that the bromine pentafluoride was not sufficiently reactive to raise the temperature of the reactants to the point where the cobalt trifluoride would be formed.

We have further discovered that a finely divided free-flowing cobalt trifluoride product, having a particle size not substantially greater than that of the cobalt-containing material used, could be obtained if the reaction was carried out with the chlorine trifluoride or bromine pentafluoride in the vapor or gaseous state. When chlorine trifluoride or bromine pentafluoride vapors or gases, hereinafter generically referred to as vapors, were reacted with cobalt or other cobalt-containing materials at temperatures less than 240° C., substantially no cobalt trifluoride was formed, the product being primarily cobalt difluoride. However, when the reaction was carried out at temperatures slightly in excess of 240° C., the desired cobalt trifluoride product was obtained. Furthermore, the product had the same finely divided physical characteristics that the cobalt-containing material had before fluorination, no apparent sintering occurring during the reaction.

In our preferred process, chlorine trifluoride or bromine pentafluoride is passed over powdered cobaltosic oxide or anhydrous cobalt difluoride. The cobalt material is heated and is preferably subjected to some agitation. The reaction is initiated at a temperature somewhat above 240° C. and goes to substantial completion before the temperature reaches 400° C. In carrying out the process, the temperature is gradually increased as the chlorine trifluoride or bromine pentafluoride vapors are passed over the cobalt-containing material. We have found it to be preferable to use a somewhat larger amount of chlorine trifluoride or bromine pentafluoride than would be necessary as calculated on a purely stoichiometric basis.

In a specific example in which cobalt trifluoride was prepared by reacting cobaltosic oxide ($Co_3O_4$) with chlorine trifluoride a reactor was charged with 252 grams of cobaltosic oxide. The temperature of the cobaltosic oxide was gradually increased to about 245° C. at which time the chlorine trifluoride was passed as a vapor into the reactor. The chlorine trifluoride vapor was slowly admixed with the reactant by agitation, as the temperature within the reaction vessel was increased, the total amount of chlorine trifluoride which was used being about 258 grams. The temperature within the reaction vessel was gradually increased to about 400° C. at which temperature it was maintained until completion of the reaction. The total time of the reaction was about 3¾ hours. In this particular instance about 30% excess chlorine trifluoride was used; however, the amount of excess chlorine trifluoride which is used is dependent primarily on the design of the reactor employed. On analyzing the exit gases from the reaction, it was found that they consisted primarily of $Cl_2$ and $O_2$, no $OF_2$ or $ClF$ being noted. This was somewhat surprising and would tend to indicate that all of the fluorine in the compound chlorine trifluoride was used in the fluorination of the cobaltosic oxide. The probable reactions involved in conversion of the cobaltosic oxide to cobalt trifluoride with chlorine trifluoride are (1) 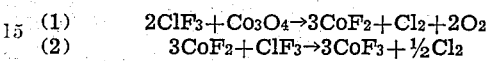
(2) $3CoF_2 + ClF_3 \rightarrow 3CoF_3 + \tfrac{1}{2}Cl_2$ In the case of bromine pentafluoride, the probable reactions are (1) 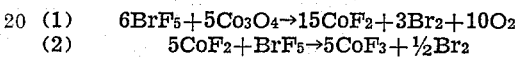
(2) $5CoF_2 + BrF_5 \rightarrow 5CoF_3 + \tfrac{1}{2}Br_2$ In preparing the cobalt trifluoride by reacting cobalt-containing materials with chlorine trifluoride or bromine pentafluoride, it is desirable that the reaction products be heated to temperatures somewhat above 240° C., such as 245° C. or 250° C., to initiate the reaction. It is preferred not to heat the reactants much above 400° C. since this is hard on the apparatus used for carrying out the reaction. However, there is no particular detriment in going to temperatures considerably higher than 400° C. if the reactor is so designed as not to be harmed thereby.

Similarly, the fluorination of other cobalt-containing materials may be carried out as above described for cobaltosic oxide and cobalt difluoride. The main benefit to be derived from the invention is the ease with which cobalt trifluoride can be manufactured through the use of either chlorine trifluoride or bromine pentafluoride, particularly in the vapor state, as the fluorinating agent and the benefits of the invention would be obtained where these fluorinating agents are used with any cobalt-containing material to produce cobalt trifluoride.

We claim:

1. The process of preparing cobalt trifluoride comprising reacting, in a substantially anhydrous atmosphere, a cobalt-containing material other than cobalt trifluoride with a substance from the group consisting of chlorine trifluoride and bromine pentatrifluoride at a temperature in excess of 240° C. and maintaining the resulting cobalt trifluoride product in a substantially anhydrous atmosphere until used.

2. The process of claim 1 in which the cobalt-containing material is cobalt difluoride.

3. The process of claim 1 in which the cobalt-containing material is a cobalt oxide.

4. The process of claim 3 in which the cobalt oxide is cobaltosic oxide.

5. The process of producing cobalt trifluoride which comprises heating a cobalt-containing material other than cobalt trifluoride to a temperature in excess of 240° C. while passing over said cobalt-containing material and in contact therewith vapors of at least one of the materials of the group consisting of chlorine trifluoride and bromine pentafluoride to cause a reaction between said cobalt-containing material and materials of said group, said reaction being carried out under substantially anhydrous conditions.

6. The process of claim 5 in which the cobalt-containing material is cobalt.

7. The process of claim 5 in which the cobalt-containing material is cobalt difluoride.

8. The process of claim 5 in which the fluorinating material is bromine pentafluoride.

9. The process of claim 5 in which said cobalt-containing material is a cobalt oxide.

10. The process of claim 9 in which the cobalt oxide is cobaltosic oxide.

11. A method of producing cobalt trifluoride which comprises heating finely divided substantially anhydrous cobalt difluoride to a temperature in excess of 240° C. while passing over said cobalt difluoride and in contact therewith vapors of chlorine trifluoride to cause a reaction between said cobalt difluoride and chlorine trifluoride, said reaction being carried out under substantially anhydrous conditions.

12. The process of producing cobalt trifluoride which comprises heating a substantially anhydrous finely divided cobalt-containing material other than cobalt trofluoride while agitating to a temperature of 245 to 400° C. while passing over said cobalt-containing material and in contact therewith vapors of at least one of the materials of the group consisting of chlorine trifluoride and bromine pentafluoride to cause a reaction between said cobalt-containing material and materials of said group, said reaction being carried out under substantially anhydrous conditions.

13. The process of claim 12 in which the cobalt-containing material is cobalt difluoride.

14. The process of claim 12 in which the material of said group is chlorine trifluoride.

15. The process of claim 12 in which the material of said group is bromine pentafluoride.

16. The process of claim 12 in which the cobalt-containing material is a cobalt oxide.

17. The process of claim 16 in which the cobalt oxide is cobaltosic oxide.

JOHN F. GALL.
HENRY C. MILLER.

No references cited.